United States Patent [19]
Kurihara et al.

[11] Patent Number: 5,405,641
[45] Date of Patent: Apr. 11, 1995

[54] TASTE-MODIFICATION COMPOSITION AND METHOD FOR STABILIZING TASTE-MODIFIER

[75] Inventors: Yoshie Kurihara, 7-4-7, Okuzawa, Setagaya-ku; Teiyu Shimada; Masako Saitoh; Kenji Ikeda; Hiromu Sugiyama; Hiroshige Kohno, all of Tokyo, Japan

[73] Assignees: Yoshie Kurihara; Asahi Denka Kogyo Kabushiki Kaisha, both of Tokyo, Japan

[21] Appl. No.: 156,676

[22] Filed: Nov. 22, 1993

Related U.S. Application Data

[60] Continuation of Ser. No. 884,056, May 15, 1992, abandoned, Division of Ser. No. 701,481, May 16, 1991, abandoned.

[30] Foreign Application Priority Data

May 22, 1990 [JP] Japan ................................. 2-131967

[51] Int. Cl.⁶ ............................................. A23L 1/22

[52] U.S. Cl. ................................... 426/655; 426/615; 426/638; 426/650; 426/534

[58] Field of Search ............... 426/615, 638, 650, 534, 426/655

[56] References Cited

FOREIGN PATENT DOCUMENTS 0350667 1/1990 European Pat. Off. .
0351566 1/1990 European Pat. Off. .
0351567 1/1990 European Pat. Off. .

OTHER PUBLICATIONS

Chemical Senses, vol. 14, No. 2, pp. 303–326, Apr. 1989.

*Primary Examiner*—Joseph Golian
*Attorney, Agent, or Firm*—Frishauf, Holtz, Goodman & Woodward

[57] ABSTRACT

A taste-modification composition comprises adding one or more selected from the group consisting of salt, carbohydrate, organic acid, amino acid and protein to fresh *Curculigo latifolia* fruits, processed fruits there of or a curculin-containing material obtained therefrom.

8 Claims, No Drawings

TASTE-MODIFICATION COMPOSITION AND METHOD FOR STABILIZING TASTE-MODIFIER

This application is a continuation, of application Ser. No. 07/884,056, filed May 15, 1992 (abandoned), which is a divisional application of Ser. No. 07/701,481 filed May 16, 1991 (abandoned).

BACKGROUND OF THE INVENTION

1. Field of the Invention

This invention relates to a taste-modification composition for stabilizing a taste-modifier comprising fresh *Curculigo latifolia* fruits, processed fruits thereof or a curculin-containing material obtained therefrom and enhancing the taste-modification function of the taste-modifier efficiently, and a method for stabilizing taste-modifier.

2. Description of the prior Art

It is known that *Curculigo latifolia* fruits, which grow in Western Malaysia and the southern part of Thailand and belong to the genus Curculigo of the family Hypoxidaceae or Amaryllidaceae, are good to eat and exhibit an appetizing effect.

SUMMARY OF THE INVENTION

The present inventors formerly found out that a sour material or water taken after eating *Curculigo latifolia* fruits would taste sweet. Thus they conducted extensive studies to identify the active ingredient of the *Curculigo latifolia* fruits. As a result, they have found out that this active ingredient is a novel protein and named it curculin.

The present inventors have further succeeded in the extraction and purification of the curculin and thus formulated it into a preparation so as to utilize this compound as a taste-modifier (refer to Japanese patent Application No. 277717/1988).

Furthermore, the present inventors have established a method for preparing a taste-modifier containing curculin by processing *Curculigo latifolia* fruits which comprises peeling *Curculigo latifolia* fruits by passing them between a revolving drum having a number of holes and a revolving belt, grinding and dispersing the fruits thus peeled in water to thereby remove seeds therefrom and then further removing water-soluble matters in the sarcocarp containing protease and various germs (refer to Japanese Patent Application No. 17421/1990).

However the taste-modifier comprising curculin, obtained by the aforesaid method, suffers from some problems such that some portion or most portion of curculin is inactivated or its activity is lowered during the processes of the extraction, purification or formulation into a preparation and thus the yield is lowered to thereby deteriorate the commercial value of the product. The problems also occur during processing steps of adding produced curculin-containing preparation to foods, mixing or heating them, or during preserving or transporting foods to which the curculin-containing preparation has been added.

Therefore an object of the present invention is to provide a taste-modification composition capable of stabilizing the taste-modifier comprising curculin with less inactivation of the curculin or less lowering of its activity during the processes of extracting and purifying the taste-modifier comprising curculin, formulating it into a preparation and adding it to foods to make processed foods and during preserving and transporting the manufactured foods, and also capable of exhibiting and maintaining the high taste-modification effect of the taste-modifier comprising curculin. The object of the present invention also includes to provide a method for stabilizing the taste-modifier comprising curculin.

As the result of the extensive studies the present inventors have found that the above objects can be achieved by adding specific substances to fresh *Curculigo latifolia* fruits, processed fruits thereof or a curculin-containing material obtained therefrom.

The present invention, which has been completed based on the above finding, provides a taste-modification composition which comprises adding one or more selected from the group consisting of salt, carbohydrate, organic acid, amino acid and protein to fresh *Curculigo latifolia* fruits, processed fruits thereof or a curculin-containing material obtained therefrom.

Further, the present invention also provides a method for stabilizing a taste-modifier which comprises adding one or more selected from the group consisting of salt, carbohydrate, organic acid, amino acid and protein to fresh *Curculigo latifolia* fruits, processed fruits thereof or a curculin-containing material obtained therefrom.

The taste-modification composition of the present invention is stable to heating, drying, freezing or the like, and capable of enhancing the taste-modification function of the taste-modifier comprising curculin efficiently. In addition, the inactivation of the taste-modifier and the lowering of the taste-modification function which occur with the passage of time can be suppressed.

Furthermore, according to the method for stabilizing the taste-modifier of the present invention, the taste-modifier comprising curculin can be stabilized to heating, drying, freezing or the like, and the taste-modification function thereof can be enhanced efficiently. In addition, the inactivation of the taste-modifier and the lowering of the taste-modification function which occur with the passage of time can be suppressed.

DETAILED DESCRIPTION OF THE INVENTION

Hereunder the taste-modification composition along with the method for stabilizing the taste-modifier will be described in detail.

Examples of the fresh *Curculigo latifolia* fruits and processed fruits thereof to be stabilized in the present invention include fresh fruits and processed fruits such as dried fruits, frozen fruits, ground fruits and pureed sarcocarp of *Curculigo latifolia* fruits. The fresh *Curculigo latifolia* fruits or processed fruits thereof may be preferably free from their peel and seeds, that is, sarcocarp and processed sarcocarp, since no curculin is contained in these parts.

Within the scope of the present invention, the method for drying the *Curculigo latifolia* fruits is not particularly restricted. Namely, such methods as drying in the sun, drying in the shade, drying with warm air, cold-drying, spray-drying, drum-drying, freeze-drying and vacuum-drying can be used in the present invention.

Within the scope of the present invention, the method for freezing the *Curculigo latifolia* fruits is not particularly restricted. Namely, quick freezing, slow freezing and self-freezing can be used in the present invention.

Within the scope of the present invention, the method for grinding *Curculigo latifolia* fruits is not particularly restricted. Namely, grinding with micro-grater or deboner is included in the method.

The sarcocarp puree described above is the sarcocarp and juice obtained by grinding the fruits without breaking seeds and by removing the peel or seeds from the fruits. The method for pureeing is not particularly restricted. Thus, treating the ground fruits with a pulper is included in the method.

Examples of the curculin-containing materials obtained from the fresh *Curculigo latifolia* or the processed fruits thereof to be stabilized in the present invention include the curculin extracted from the fresh fruits or the processed fruits thereof with the use of aqueous solution of salt or the residue obtained by removing a curculin-free component from the fresh fruits or the processed fruits.

Within the scope of the present invention, the purity of the curculin used as the taste-modifier is not restricted. The higher the purity of the curculin extracted from the fruits or the processed fruits thereof is, the more the curculin is liable to be inactivated or the more its activity is liable to be lowered. According to the present invention, however, even if the curculin is highly pure, the taste-modifier of high stability can be obtained.

When the curculin is extracted from the fresh fruits or the processed fruits, a method for drying the extract solution is not particularly restricted. Thus, drying in the sun, drying in the shade, warm air-drying, cold drying, spray drying, drum drying, freeze-drying and vacuum-drying can be used as the drying method.

The salt used in the present invention are preferably the salt except bivalent metal ion. Examples of the salt include chlorides such as sodium chloride, potassium chloride and ammonium chloride; phosphates such as sodium phosphate, potassium phosphate and ammonium phosphate; carbonates such as sodium carbonate, potassium carbonate and ammonium carbonate; sulfates such as sodium sulfate, potassium sulfate and ammonium sulfate; sulfites such as sodium sulfite, potassium sulfite and ammonium sulfite; acetates such as sodium acetate, potassium acetate and ammonium acetate; tartrates such as sodium tartrate, potassium tartrate and ammonium tartrate; nitrates such as sodium nitrate and potassium nitrate; nitrites such as sodium nitrite and potassium nitrite; pyrophosphates such as sodium pyrophosphate and potassium pyrophosphate; citrates such as sodium citrate and potassium citrate; sodium lactate; alum; burnt alum, sodium propionate; sodium benzoate; and sodium primary fumarate, and particularly sodium chloride is preferably used.

Though the curculin of high purity is less soluble in water, its solubility with water is improved when the salt are added to the curculin. Therefore it is preferable to add the above-described salt in the present invention.

In the process for preparing the taste-modifier comprising curculin to be stabilized in the present invention, when the curculin is extracted from the fresh fruits or the processed fruits with the use of aqueous solution of salt, if the taste-modifier comprising the extracted curculin contains the salt of the aqueous solution used in the extraction, it is not necessary to further add salt thereto. If the taste-modifier is extracted with aqueous solution of salt but does not contain the salt due to desalting treatment or the like, the salt may be added to the taste-modifier of the present invention.

The carbohydrate used in the present invention are not particularly restricted. For example, monosaccharides, disaccharides, trisaccharides, tetrasaccharide and polysaccharides, or sugar alcohol of the reducing derivative of these saccharides and saccharic acid of the oxidation derivative of these saccharides, and concretely, lactose, glucose, sucrose, raffinose, sorbitol, xylitol, inositol, saccharic acid, soluble starch, cyclodextrin, dextrin, pectin, gum arabic, dextran, polydextrose, locust bean gum, carboxymethylcellulose, ficoll, xanthan gum, guar gum, alginic acid, konjak mannan, agar, carrageenan, furcellaran, tragacanth gum, pullulan, chitin and chitosan can be used.

The organic acid used in the present invention is not particularly restricted. Namely, malic acid, lactobionic acid and ascorbic acid can be used.

The amino acid used in the present invention is not particularly restricted. Namely, glutamic acid, aspartic acid, lysine, arginine, cysteine, glycine, alanine, serine, α-aminobutyric acid, threonine, isovaline, asparagine, L-valine, α-methylnorvaline and phenylglycine can be used in the present invention.

The protein used in the present invention is not particularly restricted. Namely, albumin, gelatin, casein, sodium caseinate, wheat gluten, α-lactoglobulin, whey, and skim milk powder, yeast extract, meat extract and egg albumin containing much protein can be used.

Further, dipeptide, tripeptide, polypeptide which are partial hydrolysates of the above-mentioned protein can also be used as the protein. Though the uses of peptides such as the hydrolysate of globulin of soy beans with pepsine, the hydrolysate of casein with trypsin, the hydrolysate of casein with subtilisin, or the hydrolysate of casein with papain have been restricted due to the bitterness, they can also be used in the present invention.

Particularly, sodium chloride, lactose, soluble starch, dextrin, gum arabic, lysine, glycine, alanine, casein, sodium caseinate, albumin, β-lactoglobulin, whey, skim milk powder and egg albumin are preferably added in the present invention.

When two or more selected from the group consisting of the salt, carbohydrate, organic acid, amino acid and protein are added, the same kind may be combined with each other or the different kinds may be combined. For example, two or more carbohydrate can be combined with each other, otherwise the organic acid and the amino acid, or the salt, the carbohydrate and the protein can be combined.

In the present invention the addition of the salt is preferable as described above, and the addition in combination of one or more selected from the group consisting of carbohydrate, organic acid, amino acid and protein and the salt is more preferable. The combinations of salt and carbohydrate or salt and proteins are still preferable, and the combination of salt, carbohydrate and protein is particularly preferable.

In the present invention, one or more selected from the group consisting of salt, carbohydrate, organic acid, amino acid and protein may be added to the *Curculigo latifolia* fruits in any step and in any state. Namely, it may be added to the fresh fruits thereof or the fruits in such process as drying, freezing, grinding, pureeing sarcocarp, extracting or purifying. Thus, there is not particular restriction, but the addition before the freezing and drying processes is preferable in order to prevent the inactivation of the curculin or the lowering of its activity efficiently.

In the case of the fresh fruits or frozen fruits, one or more selected from the group consisting of salt, carbohydrate, organic acid, amino acid and protein are added thereto and then the obtained mixture may be formulated into preparation after drying, grinding or removal of their seeds, or the curculin may be extracted and purified from the obtained mixture after drying, grinding or removal of their seeds.

In the case that the fruits have been peeled, they are preferably treated in the same manner as above.

In the case of the dried fruits, one or more substances selected from the group consisting of salt, carbohydrate, organic acid, amino acid and protein are added when grinding the fruits and removing their seeds, and the obtained mixture is sufficiently stirred to formulate it into the preparation of uniformity.

In the case of the ground fruits and puree of sarcocarp, one or more selected from the group consisting of salt, carbohydrate, organic acid, amino acid and protein are added thereto, and the obtained mixtures are dried to formulate them into the preparations, or after that the curculin may be extracted and purified.

The amount of one or more substances selected from the group consisting of salt, carbohydrate, organic acid, amino acid and protein to be added in the present invention varies depending on the form of the taste-modification composition to be obtained. In general the amount thereof preferably ranges from 1 to 10000 parts by weight based on the part by weight of the taste-modifier comprising curculin, more particularly 5 to 1000 parts by weight.

The taste-modification composition obtained by the present invention can be formed into dried powder, paste or solution.

To further illustrate the present invention, the following Examples will be given.

EXAMPLE 1

10 Kg of fresh *Curculigo latifolia* fruits were washed with water, frozen and then subjected to vacuum freeze-drying with the use of a vacuum freeze dryer FD-1 (manufactured by TOKYO RIKAKIKAI CO., LTD). The residual moisture content thereof was approximately 7%. Then the freeze-dried fruits thus obtained were ground with a grinder TI-700A (manufactured by HEIKO MANUFACTURING, LTD) in such a manner as not to break their seeds. 12 l of 0.3M sodium chloride was added to the powder thus obtained and stirred softly. The solution thus mixed was filtered with a glass filter G2 to thereby give 12 l of a 0.3M sodium chloride extract containing curculin.

1 l of the 0.3M sodium chloride extract containing curculin thus obtained was subjected to vacuum freeze-drying with the use of a vacuum freeze dryer FD-1 (manufactured by TOKYO RIKAKIKAI Co., LTD), wherein the residual moisture content thereof was approximately 11%, to thereby give 19 g of a curculin-containing preparation.

EXAMPLE 2

50 g of lactose was added to 1 l of the 0.3M sodium chloride extract containing curculin obtained in Example 1, and then subjected to vacuum freeze-drying in the same manner as one described in Example 1, wherein the residual moisture content thereof was approximately 8 %, to thereby give 70 g of a curculin-containing preparation.

EXAMPLE 3

25 g of glycine and 5 g of malic acid were uniformly mixed. The obtained mixture was added to 1 l of the 0.3M sodium chloride extract containing curculin obtained in Example 1, stirred, dissolved and then subjected to vacuum freeze-drying in the same manner as one described in Example 1, wherein the residual moisture content thereof was approximately 8%, to thereby give 50 g of a curculin-containing preparation.

Comparative Example 1

1 l of the 0.3M sodium chloride extract containing curculin obtained in Example 1 was desalted with an ultrafiltration device, Amicon YM-5 (manufactured by Amicon Division of W. R. GRACE & Co.-Conn., fractional molecular weight: 5,000) to thereby give 1.5 g of a curculin-containing preparation.

Experimental Example 1

1 l of the 0.3M sodium chloride extract containing curculin obtained in Example 1 and the curculin-containing preparations obtained in Examples 1 to 3 and Comparative Example 1 (Example 1; 19 g, Example 2; 70 g, Example 3; 50 g and Comparative Example 1; 1.5 g) were subjected to HPLC (HPLC column; Asahi Chemical Industry GS 520) to thereby measure the curculin content of each preparation. Table 1 mentioned below shows the amount of the curculin contained in each of the curculin-containing preparations. In the Table, the amount of curculin contained in 1 l of the 0.3M sodium chloride extract containing curculin is to be 100%.

TABLE 1

| | 0.3M sodium chloride extract | Curculin-containing preparation*1 |
| --- | --- | --- |
| Example 1 | 100% | 68% |
| Example 2 | 100% | 98% |
| Example 3 | 100% | 76% |
| Comp. Exam. 1 | 100% | 36% |

*1 The curculin-containing preparation which ion exchange water was added to and dissolved again was measured so that the amount became the same as that before it was dried.

Further, each of the curculin-containing preparations obtained in Examples 1 to 3 and Comparative Example 1 was kept in the mouth in such a manner that it came in contact with the upper surface of the tongue. The amount of each preparation kept in the mouth was 0.01 g for Example 1, 0.04 g for Example 2, 0.03 g for Example 3 and 0.001 g for Comparative Example 1. After that lemon was eaten. Table 2 shows the results. In the Table, ⊙, ◯, △, X show the tastes of strong sweetness, preferable sweetness, weak sweetness and no sweetness, respectively.

TABLE 2

| | Exam. 1 | Exam. 2 | Exam. 3 | Comp. Exam. 1 |
| --- | --- | --- | --- | --- |
| Taste | ◯ | ⊙ | ⊙ | X |

Further, the same results as mentioned above were obtained from the same organoleptic test conducted after preserving each curculin-containing preparation for one month.

EXAMPLE 4

5 kg of fresh *Curculigo latifolia* fruits were washed with water, and then subjected to micrograter (performance: 200 kg/h, manufactured by SEIKENSHA Co., Ltd., MR-110 model) to thereby grind the fruits. The fruits thus ground was subjected to a pulper (performance: 300 kg/h, manufactured by SEIKENSHA Co., Ltd., PRT-180 model, pore size of screen: 0.5 mm) to thereby remove their peels and seeds. 10 l of 0.5M sodium chloride was added to the residual sarcocarp, stirred for 10 minutes and filtered with cotton cloth to thereby give 10 l of a 0.5M sodium chloride extract containing curculin.

60 g of whey was added to 2 l of the 0.5 M sodium chloride extract containing curculin thus obtained and subjected to vacuum freeze-drying with the use of a vacuum freeze dryer FD-1 (manufactured by TOKYO RIKAKIKAI Co., LTD), wherein the residual moisture content thereof was approximately 10%, to thereby give 120 g of a curculin-containing preparation (powder).

Example 5

20 g of soluble starch and 20 g of albumin were added to 2 l of the 0.5M sodium chloride extract containing curculin obtained in Example 4, and then subjected to vacuum freeze-drying in the same manner as one described in Example 4, wherein the residual moisture content thereof was approximately 9%, to thereby give 100 g of a curculin-containing preparation (powder).

Comparative Example 2

2 l of the 0.5M sodium chloride extract containing curculin obtained in Example 4 was desalted with an ultrafiltration device, Amicon YM-2 (manufactured by Amicon Division of W. R. GRACE & Co.-Conn., fractional molecular weight: 1,000) to thereby give 3 g of a curculin-containing preparation.

Experimental Example 2

2 l of the 0.5M sodium chloride extract containing curculin obtained in Example 4 and the curculin-containing preparations obtained in Examples 4 and 5 and Comparative Example 2 (Example 4; 120 g, Example 5; 100 g, and Comparative Example 2; 3 g) were subjected to HPLC (HPLC column; Asahi Chemical Industry GS 520) to thereby measure the curculin content of each preparation. Table 3 mentioned below shows the amount of the curculin contained in each of the curculin-containing preparations. In the Table, the amount of curculin contained in 2 l of the 0.5M sodium chloride extract containing curculin is to be 100%.

TABLE 3

|  | 0.3M sodium chloride extract | Curculin-containing preparation*[1] |
|---|---|---|
| Example 4 | 100% | 94% |
| Example 5 | 100% | 96% |
| Comp. Exam. 2 | 100% | 29% |

*[1]The curculin-containing preparation which ion exchange water was added to and dissolved again was measured so that the amount became the same as that before it was dried.

EXAMPLE 6

500 ml of the 0.5M sodium chloride extract containing curculin obtained in Example 4 was concentrated and desalted with an ultrafiltration device, Amicon (manufactured by Amicon Division of W. R. GRACE & Co.-Conn., fractional molecular weight: 5,000) to thereby give 100 ml of a curculin-containing desalted concentrate.

2 g of dextrin and 4 g of casein were added to the curculin-containing desalted concentrate thus obtained and subjected to vacuum freeze-drying with the use of a vacuum freeze dryer FD-1 (the residual moisture content thereof: approximately 5 %) to give 6.3 g of a curculin-containing preparation.

Comparative Example 3

The curculin-containing desalted concentrate obtained in Example 6 was subjected to vacuum freeze-drying (the residual moisture content thereof: approximately 5%) to thereby give a 0.3 g of a curculin-containing preparation.

Experimental Example 3

500 ml of the 0.5M sodium chloride extract containing curculin obtained in Example 4 and curculin-containing preparations obtained in Example 6 and Comparative Example 3 (Example 6; 6.3 g, and Comparative Example 3; 0.3 g) were subjected to HPLC (HPLC column; Asahi Chemical Industry GS 520) to thereby measure the curculin content of each preparation. Table 4 mentioned below shows the amount of the curculin contained in each of the curculin-containing preparations. In the Table, the amount of the curculin contained in 500 ml of the 0.5M sodium chloride extract containing curculin is to be 100%.

TABLE 4

|  | 0.5M sodium chloride extract | Curculin-containing preparation*[1] |
|---|---|---|
| Example 6 | 100% | 76% |
| Comp. Exam. 3 | 100% | 35% |

*[1]The curculin-containing preparation was adjusted to have the same liquid amount as the amount before it was dried.

EXAMPLE 7

10 kg of fresh Curculigo latifolia fruits were washed with water, and then subjected to micrograter (performance: 200 kg/h, manufactured by SEIKENSHA Co., Ltd., MR-110 model) to thereby grind the fruits. The fruits thus ground was subjected to a pulper (performance: 300 kg/h, manufactured by SEIKENSHA Co., Ltd., PRT-180 model, pore size of screen: 0.5 mm) to thereby give 7 kg of sarcocarp puree whose peels and seeds were removed.

3 kg of lactose was added to 3.5 kg of the sarcocarp puree thus obtained and subjected to vacuum freeze-drying with the use of a vacuum freeze dryer FD-1 (manufactured by TOKYO RIKAKIKAI Co., LTD). The residual moisture content thereof was approximately 7%.

Next, the freeze dried fruits were put through a standard sieve (JIS standard 500 μ mesh) to thereby give 3.4 kg of powdered fruits.

Comparative Example 4

3.5 kg of the sarcocarp puree obtained in Example 7 was treated in the same manner as one of Example 7 except that the lactose was not added thereto to give 0.4 kg of powdered fruits.

Experimental Example 4

30 ml of sodium dihydrogenphosphate-citric acid buffer solution (pH 3.8) was added to 6 g of the powdered fruits obtained in Example 7 and 1 g of the powdered fruits obtained in Comparative Example 4 and subjected to extraction. The obtained extract was centrifuged at 10000 rpm for 5 minutes to thereby give the samples of HPLC.

These samples of HPLC were subjected to HPLC (HPLC column; Asahi Chemical Industry GS 520) to thereby measure the curculin content of each sample.

Table 5 mentioned below shows the amount of the curculin contained in each of the powdered fruits, in which the amount of curculin contained in 3.5 kg of the sarcocarp puree is to be 100%. This sarcocarp puree is prepared as a sample of HPLC by adding 30 ml of sodium dihydrogenphosphate-citric acid buffer solution (pH 3.8) to 1 g of the sarcocarp puree, extracted and then centrifuged at 10000 rpm for 5 minutes to thereby give the of HPLC.

TABLE 5

|  | sarcocarp puree | powdered fruits |
|---|---|---|
| Example 7 | 100% | 98% |
| Comp. Exam. 4 | 100% | 71% |

What is claimed is:

1. A taste-modification composition which comprises (a) one part by weight or more salt, (b) one part by weight or more carbohydrate and (c) one part by weight or more total parts by weight of one or more selected from the group consisting of organic acid, amino acid, and protein, the parts by weight being based on the part by weight of said taste modifier comprising curculin, with the proviso that the total added amount (a), (b) and (c) is 5 to 1,000 parts by weight, added to fresh *Curculigo latifolia* fruits, processed fruits thereof or a curculin-containing material obtained therefrom; and wherein said salt is one or more selected from the group consisting of sodium chloride, sodium phosphate, sodium carbonate and sodium acetate;

said carbohydrate is selected from the group consisting of lactose, glucose, sucrose, soluble starch, and dextrin;

said organic acid is selected from the group consisting of malic acid, lactobionic acid and ascorbic acid;

said amino acid is selected from the group consisting of cysteine, glycine, and alanine; and said protein is selected from the group consisting of albumin, gelatin, casein, whey, skim milk powder and egg albumin.

2. A taste-modification composition according to claim 1, wherein salt, carbohydrate and protein are added to fresh *Curculigo latifolia* fruits, processed fruits thereof or a curculin-containing material obtained therefrom.

3. A taste-modification composition according to claim 1, wherein the amount of salt, carbohydrate, and one or more selected from the group consisting of organic acid, amino acid and protein ranges from 5 to 1000 parts by weight based on the part by weight of said taste-modifier comprising curculin.

4. The taste-modification composition according to claim 3, wherein said salt is selected from the group consisting of sodium chloride, potassium chloride, ammonium chloride, sodium phosphate, potassium phosphate, ammonium phosphate, sodium carbonate, potassium carbonate, ammonium carbonate, sodium sulfate, potassium sulfate, ammonium sulfate, sodium sulfite, potassium sulfite, ammonium sulfite; sodium acetate, potassium acetate, ammonium acetate, sodium tartrate, potassium tartrate, ammonium tartrate, sodium nitrate, potassium nitrate, sodium nitrite, potassium nitrite; sodium pyrophosphate, potassium pyrophosphate; sodium citrate, potassium citrate, sodium lactate, alum, burnt alum, sodium propionate, sodium benzoate, and sodium primary fumarate.

5. The taste-modification composition according to claim 1, wherein the salt is sodium chloride and the carbohydrate is lactose.

6. The taste-modification composition according to claim 1, wherein said salt is selected from the group consisting of sodium chloride, potassium chloride, ammonium chloride, sodium phosphate, potassium phosphate, ammonium phosphate, sodium carbonate, potassium carbonate, ammonium carbonate, sodium sulfate, potassium sulfate, ammonium sulfate, sodium sulfite, potassium sulfite, ammonium sulfite; sodium acetate, potassium acetate, ammonium acetate, sodium tartrate, potassium tartrate, ammonium tartrate, sodium nitrate, potassium nitrate, sodium nitrite, potassium nitrite; sodium pyrophosphate, potassium pyrophosphate; sodium citrate, potassium citrate, sodium lactate, alum, burnt alum, sodium propionate, sodium benzoate, and sodium primary fumarate.

7. A method for stabilizing a taste-modifier which comprises adding (a) 1–10,000 parts by weight of a salt selected from the group consisting of sodium chloride, sodium phosphate, sodium carbonate and sodium acetate, (b) 1–10,000 parts by weight carbohydrate selected from the group consisting of lactose, glucose, sucrose, soluble starch and dextrin and (c) 1–10,000 total parts by weight of one or more selected from the group consisting of malic acid, lactobionic acid and ascorbic acid, the parts by weight being based on the parts by weight of taste modifier comprising curculin, with the proviso that the total added amount of (a), (b) and (c) is 3 to 10,000 parts by weight, to fresh *Curculigo latifolia* fruits, processed fruits thereof or a curculin-containing material obtained therefrom.

8. The method composition according to claim 7, wherein said salt is selected from the group consisting of sodium chloride, potassium chloride, ammonium chloride, sodium phosphate, potassium phosphate, ammonium phosphate, sodium carbonate, potassium carbonate, ammonium carbonate, sodium sulfate, potassium sulfate, ammonium sulfate, sodium sulfite, potassium sulfite, ammonium sulfite; sodium acetate, potassium acetate, ammonium acetate, sodium tartrate, potassium tartrate, ammonium tartrate, sodium nitrate, potassium nitrate, sodium nitrite, potassium nitrite; sodium pyrophosphate, potassium pyrophosphate; sodium citrate, potassium citrate, sodium lactate, alum, burnt alum, sodium propionate, sodium benzoate, and sodium primary fumarate.

* * * * *